US011727173B2

(12) United States Patent
Maciocci et al.

(10) Patent No.: US 11,727,173 B2
(45) Date of Patent: Aug. 15, 2023

(54) SYSTEM AND METHOD FOR AUTOMATICALLY GENERATING AN OPTIMIZED BUILDING FLOOR PLATE LAYOUT

(71) Applicant: Lendlease Digital IP Pty Limited, Barangaroo (AU)

(72) Inventors: Guido Maciocci, Camperdown (AU); Mirco Bianchini, Camperdown (AU)

(73) Assignee: LENDLEASE DIGITAL IP PTY LIMITED, Barangaroo (AU)

(*) Notice: Subject to any disclaimer, the term of this patent is extended or adjusted under 35 U.S.C. 154(b) by 407 days.

(21) Appl. No.: 17/123,759

(22) Filed: Dec. 16, 2020

(65) Prior Publication Data

US 2022/0188476 A1 Jun. 16, 2022

(51) Int. Cl.
*G06F 30/20* (2020.01)
*G06F 30/13* (2020.01)

(52) U.S. Cl.
CPC .............. *G06F 30/20* (2020.01); *G06F 30/13* (2020.01)

(58) Field of Classification Search
CPC .......... G06F 30/00; G06F 30/20; G06F 30/13; G06F 2111/04; G06Q 50/08; G06Q 10/043
USPC .......................................................... 703/1
See application file for complete search history.

(56) References Cited

U.S. PATENT DOCUMENTS

| | | | |
|---|---|---|---|
| 9,157,248 B2 | 10/2015 | Solihin | |
| 9,858,712 B2 | 1/2018 | Stathis | |
| 2013/0246108 A1* | 9/2013 | Nagy | G06Q 10/0631 705/7.12 |
| 2015/0073576 A1 | 3/2015 | Ushijima | |
| 2016/0147914 A1 | 5/2016 | Bergin et al. | |
| 2017/0193402 A1 | 7/2017 | Grehant | |
| 2018/0046732 A1 | 2/2018 | Bergin et al. | |
| 2018/0089575 A1 | 3/2018 | Cheong et al. | |
| 2018/0113959 A1 | 4/2018 | Tierney et al. | |
| 2018/0209156 A1 | 7/2018 | Pettersson | |
| 2018/0260497 A1* | 9/2018 | Vanker | G06F 3/0482 |
| 2018/0268087 A1 | 9/2018 | Tierney et al. | |
| 2018/0268336 A1 | 9/2018 | Tierney et al. | |

(Continued)

FOREIGN PATENT DOCUMENTS

| | | |
|---|---|---|
| WO | 2005/114495 A1 | 12/2005 |
| WO | 2018/165654 A1 | 9/2018 |

(Continued)

OTHER PUBLICATIONS

Ghabra, Noura et al., "The Impact of the Building Envelope on the Energy Efficiency of Residential Tall Buildings in Saudi Arabia", Oct. 11, 2017, International Journal of Low-Carbon Technologies, Oxford University Press. (Year: 2017).*

(Continued)

*Primary Examiner* — Cedric Johnson
(74) *Attorney, Agent, or Firm* — Gard & Kaslow LLP

(57) ABSTRACT

The present approach automatically generates an optimized building floor plate layout given a set of building design parameters including a specified unit mix. Some or all of this process can then be repeated when building design parameters are changed thereby facilitating automated and iterative building design as differing design parameters and resulting optimized building floor plate layouts are considered.

10 Claims, 8 Drawing Sheets

(56) References Cited

U.S. PATENT DOCUMENTS

| | | |
|---|---|---|
| 2018/0276319 A1 | 9/2018 | Tierney et al. |
| 2018/0336289 A1 | 11/2018 | Benjamin et al. |
| 2018/0349817 A1 | 12/2018 | Goel et al. |
| 2018/0365343 A1 | 12/2018 | Sinha et al. |
| 2019/0014116 A1 | 1/2019 | Khi et al. |
| 2019/0026401 A1 | 1/2019 | Benjamin et al. |
| 2019/0026402 A1 | 1/2019 | Benjamin et al. |
| 2019/0065633 A1 | 2/2019 | Stoddart et al. |
| 2019/0079958 A1 | 3/2019 | Bentley et al. |
| 2019/0080520 A1 | 3/2019 | Godzaridis et al. |
| 2019/0081847 A1 | 3/2019 | Bentley et al. |
| 2019/0108245 A1 | 4/2019 | Bentley et al. |
| 2019/0147116 A1 | 5/2019 | Benjamin et al. |
| 2019/0147117 A1 | 5/2019 | Benjamin et al. |
| 2019/0147118 A1 | 5/2019 | Benjamin et al. |
| 2019/0147119 A1 | 5/2019 | Benjamin et al. |
| 2019/0147317 A1 | 5/2019 | Divekar et al. |
| 2019/0155966 A1 | 5/2019 | Nourbakhsh et al. |
| 2019/0163867 A1 | 5/2019 | Anajwala |
| 2019/0197198 A1 | 6/2019 | Cheong et al. |

FOREIGN PATENT DOCUMENTS

| | | | |
|---|---|---|---|
| WO | 2019/172782 A1 | 9/2019 | |
| WO | 2020/208638 A2 | 10/2020 | |
| WO | WO-2020208638 A2 * | 10/2020 | ............. G06F 30/13 |

OTHER PUBLICATIONS

Hachem-Vermette, Caroline, "Multistory Building Envelope: Creative Design and Enhanced Performance", Dec. 5, 2017, Solar Energy 159, Elsevier Ltd. (Year: 2017).*

"Subset sum problem," Wikipedia, Nov. 21, 2020, "https://en.wikipedia.org/w/index.php?title=Subset_sum_problem&oldid=989930670".

"CLT Rib Panels by Stora Enso," Structural design manual, Dec. 18, 2020, pp. 1-129.

"CLT by Stora Enso," Technical brochure, pp. 1-34.

* cited by examiner

Figure 7

| Unit Type | Depth | Min W | Max W | SUM | Z Priority |
|---|---|---|---|---|---|
| 3B | 26 | 47 | 49 | 35% | C,1 |
| 2B | 26 | 35 | 39 | 25% | 1,2 |
| 1B | 26 | 23 | 25 | 20% | 1,2 |
| St | 26 | 11 | 13 | 20% | 2 |

| Public | Depth | Width |
|---|---|---|
| Elevator | 26 | 20 |
| Stairs | 26 | 10 |
| Corridor | 10 | n/a |

| Zone Set | Width |
|---|---|
| C1 | 47 |
| C2 | 47 |
| C3 | 47 |
| C4 | 47 |
| Pri 450 | 140 |
| Sec 430 | 50 |
| Sec 440 | 50 |

| Pass I | | | | | Pass II | | | | | Pass III | | | | | Pass IV | | | | | Pass V | | | |
|---|---|---|---|---|---|---|---|---|---|---|---|---|---|---|---|---|---|---|---|---|---|---|---|
| | Qty | Left | CUM | Delta | | Qty | Left | CUM | Delta | | Qty | Left | CUM | Delta | | Qty | Left | CUM | Delta | | Qty | Left | CUM | Delta |
| 3B | | 0 | | | | | 0 | | | | | 0 | | | | | 0 | | | | | 0 | | |
| | | | 25% | 10% | 3B | | | 40% | -5% | | | | 33% | 2% | | | | 25% | 10% | | | | 33% | 2% |
| | | 47 | 25% | 0% | | | 47 | 20% | 5% | | | 47 | 33% | -8% | | | 47 | 25% | 0% | 3B | | 47 | 33% | 3% |
| | | 47 | | | | | 47 | | | | | 47 | | | | | 47 | | | | | | | |
| 2B | | 105 | | | | | 105 | | | | 2B | | 70 | | | | | 70 | | | | | 70 | | |
| 1B | | 27 | 25% | -5% | | | 27 | 20% | 0% | | | 27 | 17% | 3% | 1B | | 4 | 25% | -5% | | | 4 | 33% | -5% |
| St | | 39 | 25% | -5% | | | 39 | 20% | 0% | | | 39 | 17% | 3% | St | | 28 | 25% | -5% | | | 28 | 33% | -5% |

| Unit Type | Qty |  |  |  |
|---|---|---|---|---|
| 3B | 1 | | | |
| 2B | 1 | | | |
| 1B | 1 | | | |
| St | 1 | | | |

| Zone Set | Pass VI | | | | Pass VII | | | | | Pass VIII | | | | | Pass IX | | | | | Units/Zone | Unit Sizes |
|---|---|---|---|---|---|---|---|---|---|---|---|---|---|---|---|---|---|---|---|---|---|
| | | Left | | | | Qty | Left | CUM | Delta | | Qty | Left | CUM | Delta | | Qty | Left | CUM | Delta | | |
| C1 | | 0 | | | | | 0 | | | | | 0 | | | | | 0 | | | 1 x 3b | std min |
| C2 | | 0 | | | | | 0 | | | | | 0 | | | | | 0 | | | 1 x 3b | std min |
| C3 | | 0 | | | | | 0 | | | | | 0 | | | | | 0 | | | 1 x 3b | std min |
| C4 | | 47 | | | 3B | | 0 | | | | | 0 | | | | | 0 | | | 1 x 3b | std min |
| Pri 450 | 2B | 35 | | | | | 35 | | | 2B | | 0 | | | | | 0 | | | 4 x 2 B | std min |
| Sec 430 | | 4 | | | | | 4 | | | | | 4 | | | | | 4 | | | 2 x 1B | +2', +2' |
| Sec 440 | | 28 | | | | | 28 | | | | | 28 | | | 1B | | 5 | | | 1 x 1B, 2 x St | +2', +2', +1' |
| | | | | | | | | | | | | | | | | | | | | Total: 13 | |

| Unit Type | Qty | Left | CUM | Delta | | Qty | Left | CUM | Delta | | Qty | Left | CUM | Delta | | Qty | Left | CUM | Delta | OUM | |
|---|---|---|---|---|---|---|---|---|---|---|---|---|---|---|---|---|---|---|---|---|---|
| 3B | 3 | | 30% | 5% | | 4 | | 36% | -1% | | 4 | | 33% | 2% | | 4 | | 31% | 4% | 31% | |
| 2B | 3 | | 30% | -5% | | 3 | | 27% | -2% | | 4 | | 33% | -8% | | 4 | | 31% | -6% | 31% | |
| 1B | 2 | | 20% | 0% | | 2 | | 27% | -7% | | 2 | | 17% | 3% | | 3 | | 23% | -3% | 23% | |
| St | 2 | | 20% | 0% | | 2 | | 27% | -7% | | 2 | | 17% | 3% | | 2 | | 15% | 5% | 15% | |

SYSTEM AND METHOD FOR AUTOMATICALLY GENERATING AN OPTIMIZED BUILDING FLOOR PLATE LAYOUT

FIELD OF THE INVENTION

The present invention relates generally to generating a building floor plate layout.

BACKGROUND OF THE INVENTION

The process of designing buildings has traditionally been a slow, labored process. The process typically starts with a chosen building site or location along with some building design parameters such as building dimensions (e.g., width and length, height, number of stories for a building with multiple stories, etc.). A further design parameter typically specified for commercial buildings is known as unit mix, which specifies how many, or the relative percentage, of differing unit types are to be included in the building to be designed. A given unit mix for an apartment building might, for example, be 35% three bedroom unit types, 25% two bedroom unit types, 20% one bedroom unit types, and 20% studio unit types. A building designer then takes those design parameters, in conjunction the building site and local building codes and requirements (e.g., number and/or location of corridors, stairs, elevators, etc.), and designs what is known as a floor plate layout, which is a determination of where within the overall dimensions of the building floor each of those elements is to be located.

This process of designing buildings can be fairly straightforward when the specified building design parameters are themselves simple. For example, specifying a one story building, with a unit mix of 50% two bedroom unit types and 50% one bedroom unit types, and with sufficient building dimensions to easily fit at least one of each such unit types, and not being too constrained by local building codes (e.g., being a single story building there may be no requirement for stairs or an elevator and, depending upon building ingress/egress may not even need any interior corridor for access to the units) can be an almost trivial building design process. However, with a larger building (e.g., multiple floors, overall dimensions, etc.) and a greater number of desired units and/or a more complex specified unit mix and a greater number of building code requirements needing to be met, the building design process can become much more complex.

It is for this reason that building designers, who may use various design tools such as Computer-Aided Design and Computer-Aided Manufacturing ("CAD/CAM") tools, still primarily follow an ad hoc, manual (i.e., mental) process of generating a building floor plate layout in order to meet all of the specified building design elements. Typically, there are two similar but different processes used, at different scales of detail and resolution, commonly referred to as test fitting and space planning, respectively. As can be imagined, such a manual process can take quite some time and is not easily or quickly revised should one wish to change some of the specified building design elements. For example, after the building designer has painstakingly designed a building to meet the various specified building design elements, should the specified unit mix be changed in any significant way, then the building designer most likely will have to revisit many of the steps taken in the manual process in order to prepare a revised floor plate layout, essentially starting over in the building design process, a costly and time-consuming endeavor.

It is also understood that some specified building parameters cannot be met by a building designer when designing a given building. For example, should the specified unit mix, where each unit type has predefined dimensions, include a greater number or percentage of certain unit types than can be fit within the specified building dimensions then the designer is simply unable to generate a building floor plate layout that meets the specified building parameters (e.g. the specified building length may not be long enough to fit that number or percentage of the specified unit types of the specified sizes). Being unable to accommodate all of the specified building design parameters is not uncommon in more complex building designs. So, instead, a building designer generates a floor plate layout that is their best attempt at meeting all of the specified building requirements, including the specified unit mix. However, because a manual process typically lacks any structured approach to determine how best to meet the specified unit mix, and given the real world time and expense constraints of building design that limits repetitive, manual, trial and error design attempts, there is no guarantee that a truly optimized floor plate layout is generated in a given instance. This problem of lacking an optimized building floor plate layout design is then exacerbated when building design specifications later change, and are therefore generally avoided due to the time delay and expense of having the building designer repeat such an ad hoc, manual process which still likely won't be an optimized design.

What is needed, therefore, is an automated approach to generating an optimized building floor plate layout given a set of specified building parameters. A further need is for such an automated approach to incorporate changes in the specified building parameters while continuing to generate an optimized building floor plate layout in a timely manner.

SUMMARY OF THE INVENTION

One embodiment discloses a method for generating an optimized building floor plate layout, the method comprising; generating, by a floor plate solver module, a set of prioritized two-dimensional zones within a perimeter of a building floor plate based on building dimensions and building envelope scores, wherein the prioritized two-dimensional zones define different functional areas comprising unit zones and one or more vertical transport zone; generating, by a unit mix solver module, an optimized mix of unit types based on a specified mix of unit types and the prioritized two-dimensional zones, wherein the optimized mix of unit types most closely matches the specified mix of unit types that fit in the prioritized two-dimensional zones, and wherein the optimized mix of unit types identifies which unit types of the optimized mix of unit types are to be placed in which of the prioritized two-dimensional zones; and, and specifying, by a layout solver module, a location within the floor plate layout of each unit type of the optimized mix of unit types based on the optimized mix of unit types In a further embodiment of the method, generating the optimized mix of unit types based on the specified mix of unit types and the prioritized two-dimensional zones comprises: (i) adding units, one per unit type, to the unit zones based on priority of the prioritized two-dimensional zones and the specified mix of unit types to create a current unit mix; (ii) calculating a delta between the specified mix of unit types and the current unit mix; (iii) selecting one unit of whichever unit type has a largest calculated delta from the calculated delta between the specified unit mix of unit types and the current unit mix; (iv) adding the selected one unit type having the largest calculated delta to the current unit mix based on the prioritized two-dimensional zones; and, (v) repeating steps (ii) through (iv) for any remaining room for another unit in any of the prioritized two-dimensional zones.

In a still further embodiment of the method, the method further comprises receiving a different specified mix of unit types and repeating the steps of generating the optimized mix of unit types and specifying the location of each unit type without repeating generating the prioritized two-dimensional zones.

Another embodiment discloses a system for generating an optimized building floor plate layout, the system comprising: a floor plate solver module configured to generate a set of prioritized two-dimensional zones within a perimeter of a building floor plate based on building dimensions and building envelope scores, wherein the prioritized two-dimensional zones define different functional areas comprising unit zones and one or more vertical transport zone; a unit mix solver module configured to generate an optimized mix of unit types based on a specified mix of unit types and the prioritized two-dimensional zones, wherein the optimized mix of unit types most closely matches the specified mix of unit types that fit in the prioritized two-dimensional zones, and wherein the optimized mix of unit types identifies which unit types of the optimized mix of unit types are to be placed in which of the prioritized two-dimensional zones; and, a layout solver module configured to specify a location within the floor plate layout of each unit type of the optimized mix of unit types based on the optimized mix of unit types.

In a further embodiment of the system, wherein the unit mix solver configured to generate the optimized mix of unit types based on the specified mix of unit types and the prioritized two-dimensional zones is configured to: (i) add units, one per unit type, to the unit zones based on priority of the prioritized two-dimensional zones and the specified mix of unit types to create a current unit mix; (ii) calculate a delta between the specified mix of unit types and the current unit mix; (iii) select one unit of whichever unit type has a largest calculated delta from the calculated delta between the specified unit mix of unit types and the current unit mix; (iv) add the selected one unit type having the largest calculated delta to the current unit mix based on the prioritized two-dimensional zones; and, (v) repeat steps (ii) through (iv) for remaining room for another unit in any of the prioritized two-dimensional zones.

In a still further embodiment of the system, the system is further configured to receive a different specified mix of unit types and repeat generating the optimized mix of unit types and specifying the location of each unit type without repeating generating the prioritized two-dimensional zones.

BRIEF DESCRIPTION OF THE DRAWINGS

FIG. 7 is a block diagram of example data sets and example resulting values of various processes and determinations made according to one embodiment of the present approach.

DETAILED DESCRIPTION OF THE INVENTION

A method and apparatus is disclosed herein for automatically generating an optimized building floor plate layout given a set of building design parameters including a specified unit mix.

Figure 1:
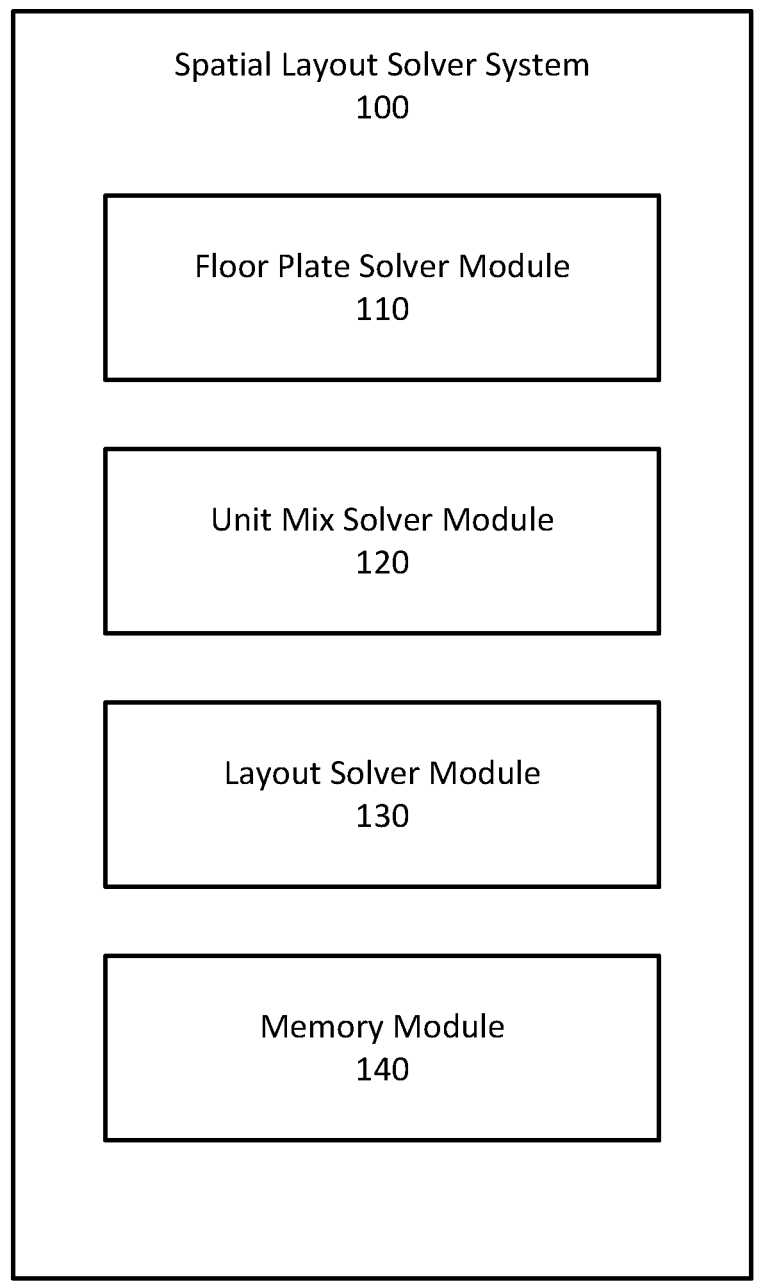
FIG. 1 is a block diagram of an example system configured to generate an optimized building floor plate layout according to one embodiment of the present approach.

Referring now to the system diagram of FIG. 1, a Spatial Layout Solver System 100 is shown comprising a Floor Plate Solver Module 110, a Unit Mix Solver Module 120, a Layout Solver Module 130, and a Memory Module 140. In one embodiment, Spatial Layout Solver System 100 is a computing system (e.g., a processor) in which Floor Plate Solver Module 110, Unit Mix Solver Module 120 and Layout Solver Module 130 are computing modules (software, hardware or some combination thereof) and Memory Module 140 is operating and/or storage memory for use by the computing system. Also input by a user and/or stored in Memory Module 140 are a predefined depth, as well as a minimum and a maximum width, of each unit type to be considered for placement in the floor plate layout.

As has been described, generating a building floor plate layout uses a specified chosen building site and specified building parameters. Using this information, referring now to FIG. 2, a method 200 for automatically generating an optimized building floor plate layout is shown in flowchart form. With this method, in step 210, Floor Plate Solver Module 110 of FIG. 1 generates two-dimensional zones or regions within a perimeter of the floor plate as defined by the specified building parameters where the two-dimensional zones define different functional areas (e.g., areas for unit zones, areas for vertical transport zones such as stairs and elevators, and areas for circulation spaces such as corridors and/or elevator lobbies, each as needed based on the specified building parameters) that are prioritized based on known building design factors (e.g., corners are more desirable due to greater frontages, certain views are more desirable than others, etc.)

In step 220, Unit Mix Solver Module 120 of FIG. 1 then generates an optimized mix of unit types according to the specified unit mix and the prioritized two-dimensional zones generated by the Floor Plate Solver Module 110. It is to be understood in light of the teachings herein that such an optimized mix is a best fit attempt at meeting the specified unit mix, but due to other specified building design parameters and local building code requirements may not be an exact fit in that it may not exactly match the specified unit mix. It is to be noted that, and as explained further elsewhere herein, Unit Mix Solver Module 120 does not specify a particular location of any given unit type and instead is responsible for determining an optimum mix of unit types that best matches the specified unit mix for the prioritized two-dimensional zones.

In step 230, Layout Solver Module 130 of FIG. 1 then specifies a location of each of the different unit types according to the optimized unit mix generated by the Unit Mix Solver 120 and the prioritized two-dimensional zones generated by the Floor Plate Solver Module 110. Thus, it is Layout Solver Module 130 that determines the specific location of the different unit types within the generated floor plate layout.

It is to be understood that any or all of the above processes performed by the corresponding elements shown in the Spatial Layout Solver System 100 of FIG. 1, and the generated intermediate and/or final results of each, as well as the specified building parameters, can be stored in Memory Module 140 thereof, in a given implementation of the present approach.

It is to be further understood in light of the teachings herein that any part or all of the automated process of flowchart 200 can be repeated as needed to accommodate changes in the specified building parameters. Thus, after the system and method described herein has automatically generated one optimized building floor plate layout based on one set of specified building parameters, the system and method can automatically generate another optimized building floor plate layout based on a specified different set of building parameters. For example, the present approach can be used to automatically generate a different optimized floor plate layout by specifying a different unit mix. This means that the present automated approach can be performed iteratively as different building parameters are considered.

Furthermore, changing building design parameters that are not used in earlier portions of the present automated approach do not require repeating those earlier portions of the process. Again using the example of specifying a different unit mix, Floor Plate Solver Module 110 does not need to again generate the prioritized two-dimensional zones because that portion of the present approach does not depend upon the specified unit mix. As such, in one embodiment, only later portions of the present approach that do use specified unit mix would be repeated to generate the new optimized floor plate layout based on the change in specified unit mix.

Such iterative processing of the present approach thus provides for essentially real-time evaluation of alternative building parameters without incurring the time and expense of the ad-hoc, non-optimized, manual building design approach presently known.

In accordance with one embodiment, a more detailed example of the present approach will now be explained.

Figure 2:
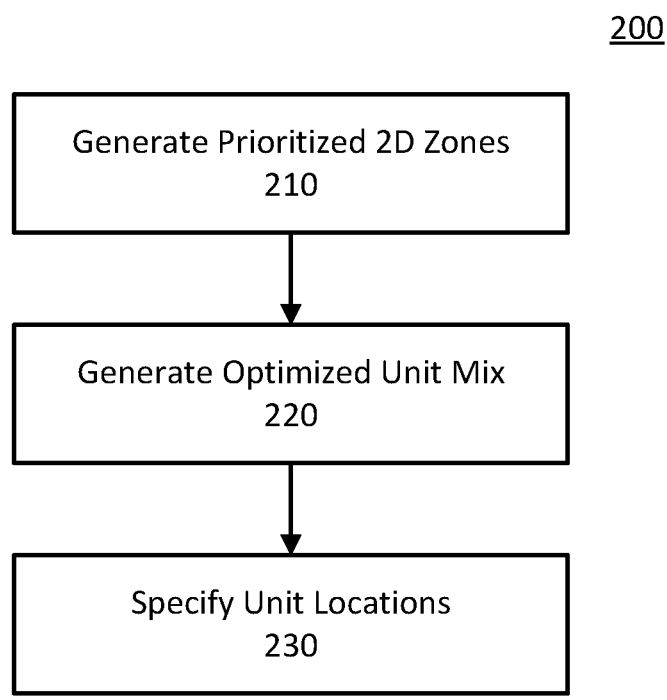
FIG. 2 is a flowchart of a process of generating an optimized building floor plate layout according to one embodiment of the present approach.
Figure 3:
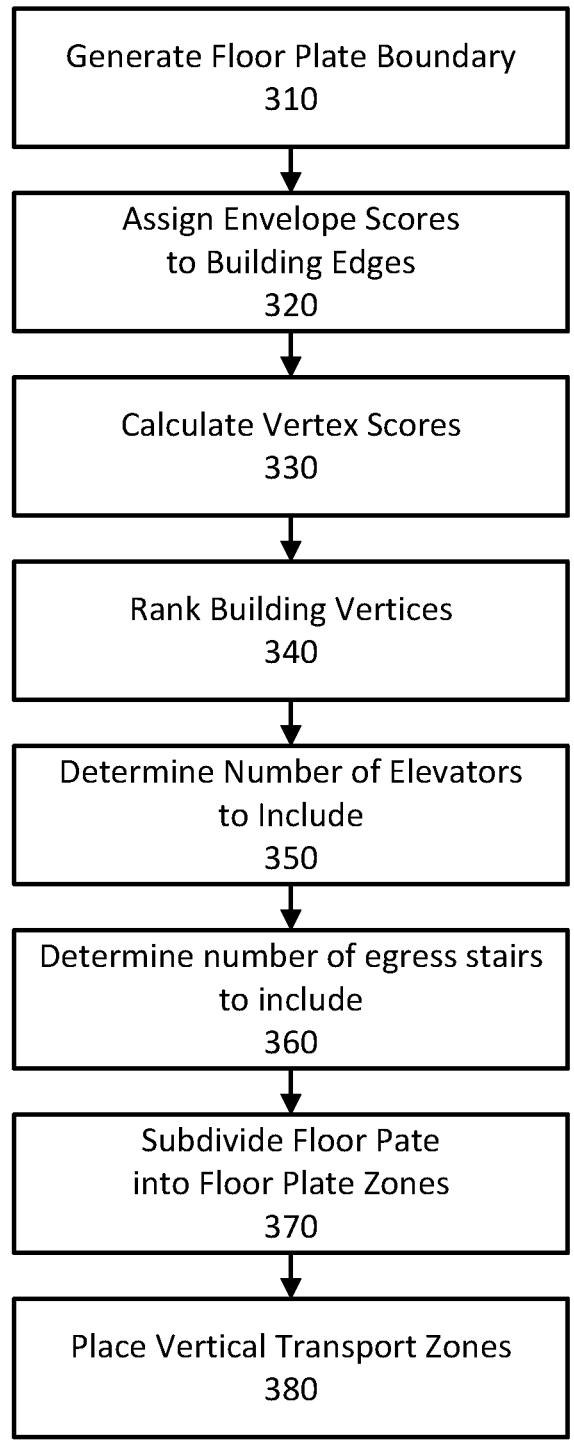
FIG. 3 is a flowchart of a more detailed process of generating prioritized two-dimensional zones for use in generating an optimized building floor plate layout according to one embodiment of the present approach.

Referring now to FIG. 3, and in accordance with one embodiment, a more detailed example of Floor Plate Solver Module 110 of FIG. 1 generating prioritized two-dimensional zones according to step 210 of FIG. 2 is shown as process 300.

In step 310, a floor plate boundary is generated based on the specified building parameters. In particular, in one embodiment, Floor Plate Solver Module 110 of FIG. 1 generates the floor plate boundary (e.g., length and width of the floor plate) based on the specified building parameter of building spine (e.g., a specified length of the building to be designed), specified unit depth (e.g., a specified depth of each of the unit types, e.g., 26 feet or 28 feet), and any relevant building code or user-specified building parameters regarding central corridor width, demising wall thickness, etc.

In step 320, an envelope score is assigned to each edge of the floor plate boundary generated in step 310. In particular, in one embodiment, Floor Plate Solver Module 110 of FIG. 1 assigns an envelope score to each edge of the floor plate boundary using specified building parameter inputs such as orientation and view scores. It is known in the art of building design that certain orientations (e.g., South versus North in the Northern Hemisphere, and North versus South in the Southern Hemisphere) and views (e.g., ocean versus mountain, unobstructed versus obstructed, etc.) are more desirable. Floor Plate Solver 110 uses these specified building parameters, input by a user and/or determined by the system based on specified building location in combination with publicly available information (e.g., existing neighboring buildings, topographical features, typical weather patterns, etc.) to assign each edge of the floor plate boundary with a ranking from best to worst, referred to herein as an envelope score.

In step 330, a vertex score is calculated for each vertex (i.e., corner) of the floor plate boundary based on adjacent envelope edge scores generated in step 320. In particular, in one embodiment, Floor Plate Solver Module 110 of FIG. 1 calculates a vertex score for each vertex of the floor plate boundary based on adjacent envelope edge scores generated in step 320. As a result, a vertex adjacent to a more desirable side of the building receives a higher vertex score than a vertex adjacent to a less desirable side of the building.

In step 340, the building floor plate vertices are ranked. In particular, in one embodiment, Floor Plate Solver Module 110 of FIG. 1 ranks the building floor plate vertices from highest to lowest according to the vertex scores calculated in step 330.

In step 350, a determination is made regarding how many elevators are to be included in the building design. In particular, in one embodiment, Floor Plate Solver Module 110 of FIG. 1 determines the number of elevators to be included in the building design based on local building code requirements (e.g., location and minimum distances for egress, etc.) and floor area of the generated floor plate boundary.

In step 360, a determination is made regarding how many egress stairs (i.e., the number of stairwells) are to be included in the building design. In particular, in one embodiment, Floor Plate Solver Module 110 of FIG. 1 determines the number of egress stairs to be included in the building design based on local building code requirements (e.g., location and minimum distances for fire egress, etc.) and floor plate dimensions of the generated floor plate boundary.

In step 370, the floor plate is subdivided into floor plate zones of defined types and, in step 380, vertical transport zones (e.g., stairs, elevators, etc.) are placed in appropriate floor plate zones. In particular, in one embodiment, Floor Plate Solver Module 110 of FIG. 1 subdivides the floor plate generated in step 310 into separate floor plate zones of defined types (e.g., corner zones, primary zones, secondary zones, etc.) based on the vertex scores generated in step 330 and envelope edge scores generated in step 320.

Figure 4:
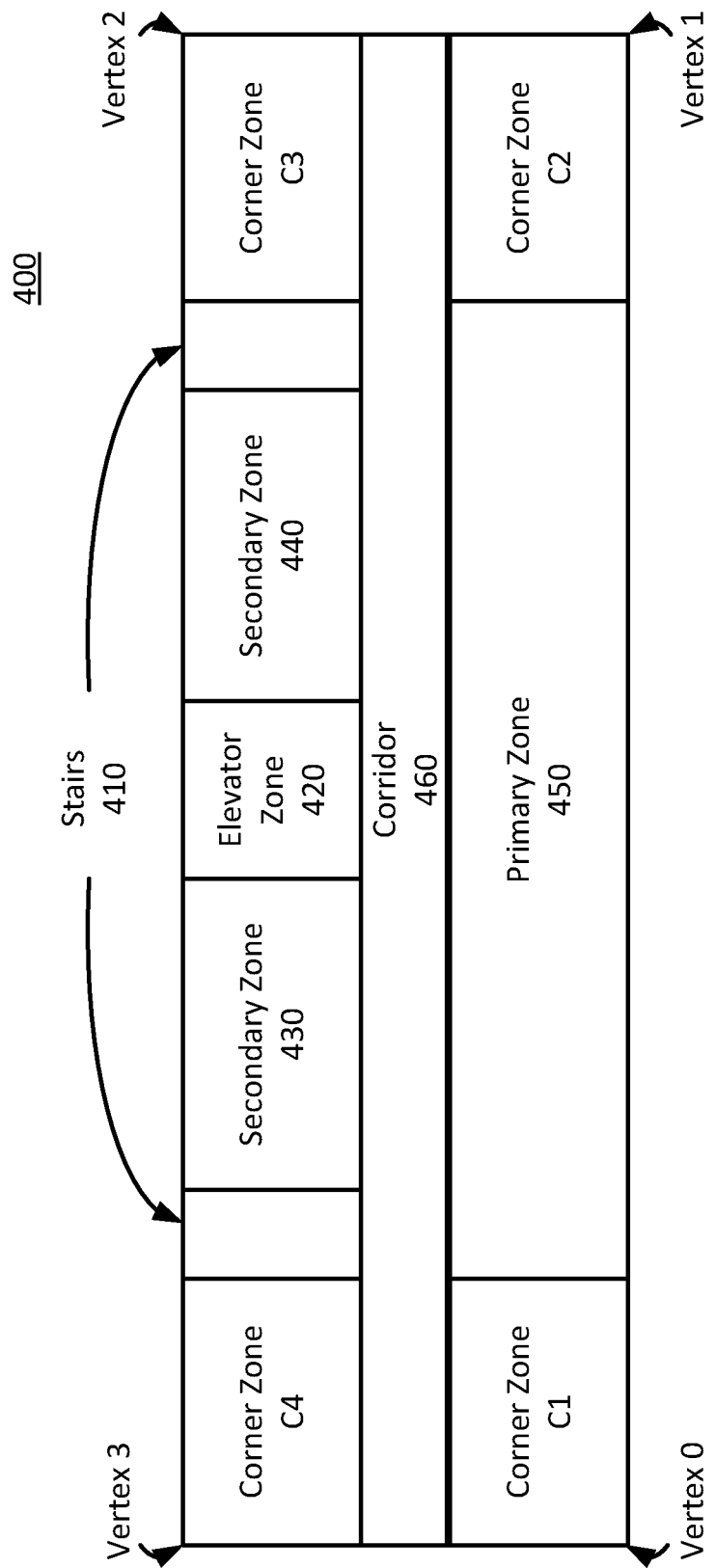
FIG. 4 is a block diagram of a floor plate subdivided into prioritized two-dimensional floor plate zones for use in generating an optimized building floor plate layout according to one embodiment of the present approach.

In one example, referring now to FIG. 4, a floor plate 400 (shown as the rectangle having vertices 0, 1, 2 and 3, with a central corridor 460 running the length of the building, which is one default building design layout of the present approach) is subdivided such that a corner zone C1 is located within floor plate 400 on the corner having the highest ranked vertex score (designated Vertex 0), corner zone C2 is located within floor plate 400 on the corner having the next highest ranked vertex (designated Vertex 1), corner zone C3 is located within floor plate 400 on the corner having the next highest ranked vertex (designated Vertex 2), and corner zone C4 is located within floor plate 400 on the corner having the next highest ranked vertex (designated Vertex 3, which, in a rectangular building having four corners would therefore be the lowest ranked vertex). In one embodiment, the length of one or all corner zones is set to be at least as long as a widest unit in the specified unit mix to ensure adequate space to place such unit in a corner zone, typically a more desirable zone.

Further in this example and as shown in the figure, floor plate 400 is subdivided such that a primary zone is located within floor plate 400 between corner zone C1 and corner zone C2 (this is because the building edge between highest ranked vertex, Vertex 0 in this example, and the next highest ranked vertex, Vertex 1 in this example, is the mostly highly ranked building edge and therefore the most desirable building edge in floor plate 400 within which to place a zone).

Still further in this example and according to one embodiment, floor plate 400 is subdivided such that any required egress stair zones 410, as determined in step 360, are placed within floor plate 400 adjacent to corner zone C3 and corner zone C4 (this is because the building edge between corner zone C3 and corner zone C4 is the lowest ranked building edge in a rectangular building and therefore any required egress stair zones consume space on the lowest ranked building edge and by placing any required egress stair zones adjacent to corner zones on that building side also maximizes remaining space within floor plate 400 for other zones). Placement of egress stair zones 410 also takes into consideration minimum egress distances according to relevant building code requirements (it being understood, in light of the teachings herein and depending upon overall building length, that a greater or lesser number of stair zones 410 may be placed in order to meet relevant building code requirements).

Further still in this example and according to one embodiment, floor plate 400 is subdivided such that any required elevator zone 420 is placed within floor plate 400 along the building edge having the lowest envelope edge score and at a point midway or centered along that building edge. If multiple elevator zones 420 are required, as determined in step 360, in accordance with one embodiment, they would be placed within floor plate 400 along the building edge having the lowest envelope edge score at an equal distance from the corners so as to minimize travel distance within the central corridor to an elevator zone 420 from any unit types later placed within the floor plate.

Lastly, in this example, floor plate 400 is subdivided such that any remaining space within floor plate 400 between the now-placed stair zones 410 and elevator zone 420 is designated as one or more secondary zone, shown in the figure as Secondary Zone 430 and Secondary Zone 440.

As now shown and explained, Floor Plate Solver Module 110 of FIG. 1, according to step 210 of FIG. 2, and more particularly according to process 300 of FIG. 3, generates a set of prioritized two-dimensional zones within a floor plate according to various inputs and determinations, as shown by example in FIG. 4.

Figure 5:
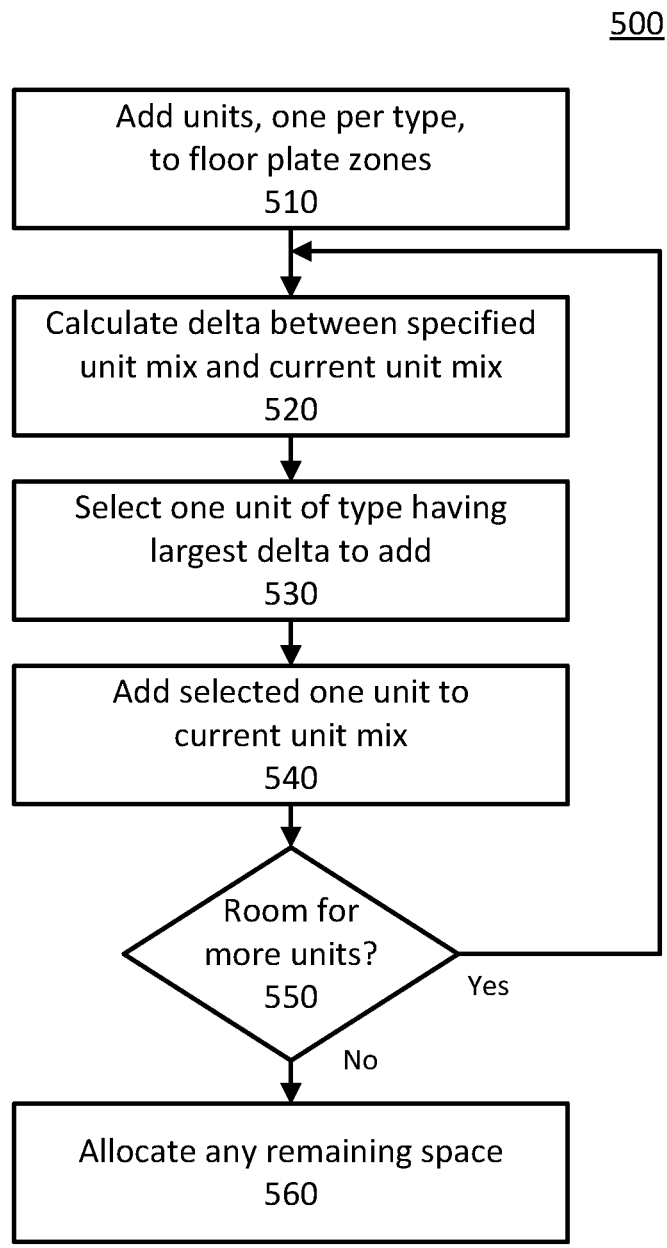
FIG. 5 is a flowchart of a more detailed process of generating an optimized mix of units for use in generating an optimized building floor plate layout according to one embodiment of the present approach.

Referring now to FIG. 5, in accordance with one embodiment, a more detailed example of Unit Mix Solver Module 120 of FIG. 1 generating an optimized mix of unit types according to step 220 of FIG. 2 is shown as process 500.

In step 510, Unit Mix Solver Module 120 of FIG. 1 adds units, one per unit type in the specified unit mix, according to their specified priority floor plate zone, in order to generate what is referred to herein as a current unit mix. It is to be understood, as explained elsewhere herein, that adding a unit type to a floor plate zone refers to creating an association between an instance of a unit type and a floor plate zone rather than to specifying a particular location of a unit within the floor plate layout.

An example will now be shown and described with reference to FIG. 7 and with a specified building length of 234 feet. In this example, the specified unit mix (denoted "SUM" in the figure) is 35% three bedroom unit types, 25% two bedroom unit types, 20% one bedroom unit types, and 20% studio unit types, each having a predefined depth (shown as 26 feet in the figure), and minimum and maximum unit width (also shown in the figure as 47 to 49 feet for three bedroom unit types, 35 to 39 feet for two bedroom unit types, 23 to 25 feet for one bedroom unit types, and 11 to 13 feet for studio unit types).

Also in this example, three bedroom unit types have been specified as having a floor plate zone priority of "corner zone" then "priority 1 zone" (denoted in the figure as "C,1"), two bedroom unit types are specified as having a floor plate priority of "priority 1 zone" then "priority 2 zone" (denoted in the figure as "1,2"), one bedroom unit types specified as having a floor plate priority of "priority 1 zone" then "priority 2 zone" (also denoted in the figure as "1,2"), and studio unit types specified as having a floor plate priority of "priority 2 zone" (denoted in the figure as "2"), it being understood that these specified floor plate zone priorities correspond to the zone types explained above (i.e., corner zone, priority 1 zone, priority 2 zone, etc.) and specify a prioritized zone location for where a unit type is desired to ultimately be placed in the floor plate layout according to the present approach.

These specified floor plate priorities, user-specified and/or hardcoded into the system in a given implementation and in one embodiment are stored in Memory Module 140 of FIG. 1, direct where different unit types will ultimately be placed in the generated building floor plate layout according to the present approach without specifying exactly where in the floor plate layout specific unit types are to be located. Again it is to be understood that Unit Mix Solver Module 130 of FIG. 1 performs the process of determining the optimum unit mix but does not itself determine the specific location of the units, which is instead left to the Layout Solver Module 130 of FIG. 1 to do.

Adding units to the current unit mix, one per unit type in the specified unit mix, according to their specified floor plate zone priority, according to this example shown in FIG. 7, and using the example generated set of prioritized two-dimensional zones within a floor plate shown in FIG. 4, would thus add a three bedroom unit type to corner zone C1, add a two bedroom unit type to primary zone 450, add a one bedroom unit type to secondary zone 430, and add a studio unit type to secondary zone 440 (as denoted in the figure under the "Pass I" heading of quantity (abbreviated to "QTY" in the figure) where the number "1" is shown). Stated differently, in this part of the process, each of the floor plate layout zones of FIG. 4 suitable for containing a unit type (as opposed to containing stairs or elevators) can be considered a set, repository, group, or bucket (and hereinafter referred to as a "Zone Set") into which one or more unit type is added in order to determine the optimum unit mix without yet having to determine a specific location within the floor plate layout for the various unit types.

As also shown in FIG. 7, adding a unit of a given unit type to a zone set reduces available space in that zone set for the later addition of another unit type. Therefore, an amount of remaining space left (denoted "Left" in the figure) after adding a given unit type to a zone set is calculated for later use as explained further elsewhere herein. In the example of FIG. 7, after the Pass 1 additions, leaves zero feet left in Zone Set C1 (C1 zone width of 47 feet minus three bedroom unit type minimum width of 47 feet), 47 feet left in Zone Set C2 (C2 zone width of 47 feet minus no unit type width), 47 feet left in Zone Set C3 (C3 zone width of 47 feet minus no unit type width), 47 feet left in Zone Set C4 (C4 zone width of 47 feet minus no unit type width), 105 feet left in Primary Zone Set 450 (zone width of 140 feet minus two bedroom unit type minimum width of 35 feet), 27 feet left in Secondary Zone Set 430 (zone width of 50 feet minus one bedroom minimum width of 23 feet), and 39 feet left in Secondary Zone Set 440 (zone width of 50 feet minus studio minimum width of 11 feet).

Then, in step 520 of FIG. 5, Unit Mix Solver Module 120 of FIG. 1 calculates a delta between the specified unit mix generated in step 510 and the current unit mix. Again using the above example and referring again to FIG. 7, and on the first pass through the process where only one of each unit type has been added to the current unit mix (denoted "CUM" in FIG. 7), the delta is 10% for three bedroom unit types (35% specified-25% achieved), 0% for two bedroom unit types (25% specified-25% achieved), 5% for one bedroom unit types (20% specified-25% achieved), and 5% for studio unit types (20-% specified-25% achieved).

In step 530 of FIG. 5, Unit Mix Solver Module 120 of FIG. 1 selects one of the unit types based on whichever is the largest delta calculated in step 520 to next be added to the current unit mix. Again using the above example, the largest delta is 10% for three bedroom unit types as shown in FIG. 7 under the heading of "Delta" for "Pass 1". As a result, a three bedroom unit type is selected in this step to next be added.

In step 540 of FIG. 5, Unit Mix Solver Module 120 of FIG. 1 adds the unit type selected in step 530 to the current unit mix according to the specified floor plate zone priority. Again using the above example, the selected unit type is a three bedroom unit type and because there is a corner zone available (i.e., corner zone C2) the three bedroom unit type will be added to corner zone C2 of FIG. 4 based on a specified floor plate zone priority of "corner" then "1" as shown in FIG. 7 under "Pass II" denoted as "3B" for Zone Set C2. It is be noted in this example that adding the three bedroom unit type to Zone Set C2 can be done because there remains sufficient space left in the zone set for a unit of that unit type (in this example, Zone Set C2 had 47 feet left and a three bedroom unit has a specified minimum width of 47 feet) and because Zone Set C2 is of a higher priority than Zone Set C3 or Zone Set C4.

In one embodiment, adding a unit type to a specified floor plate zone is simply a matter of adding an instance of that unit type to a Zone Set (e.g., data set, list, group, etc.) of one or more unit types for the floor plate zone, which, as noted elsewhere, can be stored in Memory Module 140 of FIG. 1. In the example above, this means a three bedroom unit type is added as an item in the unit set for corner zone C2, denoted as "3B" under "Pass II" for Zone Set C2 in FIG. 7. It is to be noted that further use of a zone unit set is explained elsewhere herein.

In step 550 of FIG. 5, Unit Mix Solver Module 120 of FIG. 1 determines whether there is any room left to fit any more unit types in the prioritized floor plate zones. Again using the above example, a determination is made regarding whether there is enough room left in one or more of the prioritized floor plate zones to place the smallest unit type, which in this example is a studio unit type (which, according to the example shown in FIG. 7, has a minimum width of 11 feet).

If the answer in step 550 is that there is room to add another unit type to be used in the floor plate layout, then the process returns to step 520 to calculate a new delta between the now current unit mix and the specified unit mix, select a unit type to add based on the largest calculated delta in step 530, and add the selected unit type in order of specified floor plate zone priority in step 540 (thus adding another instance of a unit type to a floor plate zone unit set), and again determine if there is any room left to add any more unit types in the prioritized floor plate zone sets in step 550. It is to be noted that in light of the teachings herein, this process of repeating steps 520, 530, 540 and 550 when there is still room to add another unit type to be used in the floor plate layout thus ultimately creates a current unit mix that is an optimum unit mix most closely matching the specified unit mix, as will now be explained by example.

Referring again to FIG. 7, steps 520, 530, 540 and 550 of FIG. 5 are repeated when there is room to add another unit to the current unit mix. In particular, as shown in the figure under the heading of "Pass II", with a "Delta" of "5%", a two bedroom unit type is added to Primary Zone Set 450, as shown under the heading of "Pass III", thus leaving 70 feet left (105 feet left from the previous pass minus a newly added two bedroom unit minimum width of 35 feet). Further, adding a two bedroom unit type in Pass III thus results in a new current unit mix where both a one bedroom unit type and a studio unit type each have a largest difference, denoted "3%" under the heading of "Delta" in the figure. As explained above regarding with reference to step 550 of FIG. 5, this repeating process continues until there is no more room to place another unit type in any of the floor plate zone sets, as shown in the example of FIG. 7 where under the heading of "Pass IX" there is only 4 feet left in Secondary Zone Set 430 and only 5 feet left in Secondary Zone Set 440, neither of which is enough to fit the addition of another unit type given the specified minimum unit widths.

If the answer in step 550 of FIG. 5 is that there no more rom to place another unit type in the floor plate, then the current unit mix is the optimum unit mix (it is the best fit possible to achieve the specified unit mix given the other building specification parameters). Thus, as a result of the above-described repeating process, the current unit mix, shown in the example of FIG. 7 as 31% three bedroom unit types, 31% two bedroom unit types, 23% one bedroom unit types, and 15% studio unit types (which can also be stated as 31%/31%/23%/15%), is deemed to be the optimum unit mix (denoted "OUM" in the figure) given the specified building parameters. In other words, given the specified unit mix (denoted "SUM" in the figure) of 35%/25%/20%/20%, the optimum or best possible mix is 31%/31%/23%/15% given the other specified building parameters.

Having now determined that there is no more room to place another unit of any unit type, the process then continues to step 560 of FIG. 5 where any remaining space in any floor plate layout zone is allocated, by Unit Mix Solver Module 120 of FIG. 1, to one or more of the unit types added for that floor plate layout zone set. In one embodiment, that remaining zone set space is allocated, in turn and to a maximum extent, to each of the unit types specified in the given zone set, limited only by the maximum specified width of such unit types, as will now be explained.

Again using the above example and with reference to FIG. 7, with a remaining four feet of space left in Secondary Zone Set 430 not being large enough to fit a studio unit type with a specified minimum width of 11 feet, that remaining four feet will now be allocated. In that case, one or more of the unit types that were added to Secondary Zone Set 430 is allocated an amount of that remaining four foot portion. In one embodiment, those unit types specified for that zone set has its width increased, in turn and until all remaining zone set portions are taken up, by an amount not to exceed its maximum specified unit width, thus maximizing incorporation of the remaining portion within those increased size unit types, while at the same time maintaining uniformity across those unit types not incorporating any of the remaining portion.

Thus, in this example where there are two, one bedroom unit types added to Secondary Zone Set 430, a first of the one bedroom unit types will receive two feet of the remaining four foot portion of Secondary Zone Set 430, because that additional two feet does not exceed the maximum specified unit width of 25 feet for a one bedroom unit type, and then a second of the one bedroom unit types will receive two feet of the now remaining two foot portion of the Secondary Zone Set 430, again because that additional two feet does not exceed the maximum specified unit width of 25 feet for a one bedroom unit type.

Similarly, again using the above example and with reference to FIG. 7, with a remaining five feet of space left in Secondary Zone Set 440 not being large enough to fit a studio unit type with a specified minimum width of 11 feet, that remaining five feet will now be allocated. In that case, one or more of the unit types that were added to Secondary Zone Set 440 is allocated an amount of that remaining five foot portion. In one embodiment, those unit types specified for that zone set has its width increased, in turn and until all remaining zone set portions are taken up, by an amount not to exceed its maximum specified unit width, thus again maximizing incorporation of the remaining portion within those increased size unit types, while at the same time maintaining uniformity across those unit types not incorporating any of the remaining portion.

Thus, in this example, where there is one, one bedroom unit type and two, studio unit types added to Secondary Zone Set 440, the one bedroom unit type will receive two feet of the remaining five foot portion of Secondary Zone 440, because that additional two feet does not exceed the maximum specified unit width of 25 feet for a one bedroom unit type, then the first of the two studio unit types will receive two feet of the now remaining three foot portion of Secondary Zone 440, because that additional two feet does not exceed the maximum specified width of 13 feet for a studio unit type, and then the second of the two studio unit types will receive one foot of the now remaining one foot portion of Secondary Zone 440, because that additional one foot does not exceed the maximum specified width of 13 feet for a studio type.

As now shown and explained, Unit Mix Solver Module 120 of FIG. 2, according to step 220 of FIG. 2, and more particularly according to process 500 of FIG. 5, and by example with reference to FIG. 7, generates an optimized mix of unit space types. Further, as has also been noted, Unit Mix Solver Module 120, according to this step and process, performs the process of determining an optimum unit mix but does not itself determine the specific location of the various units within the ultimately generated floor plate. Instead, regarding location of units within the ultimately generated building floor plate, Unit Mix Solver 120 specifies a certain number of different unit types to be placed within certain floor plate zones, which in a given embodiment can be stored in Memory Module 140 of FIG. 1 as a set of units of one or more unit types to be included in each floor plate zone.

Figure 6:
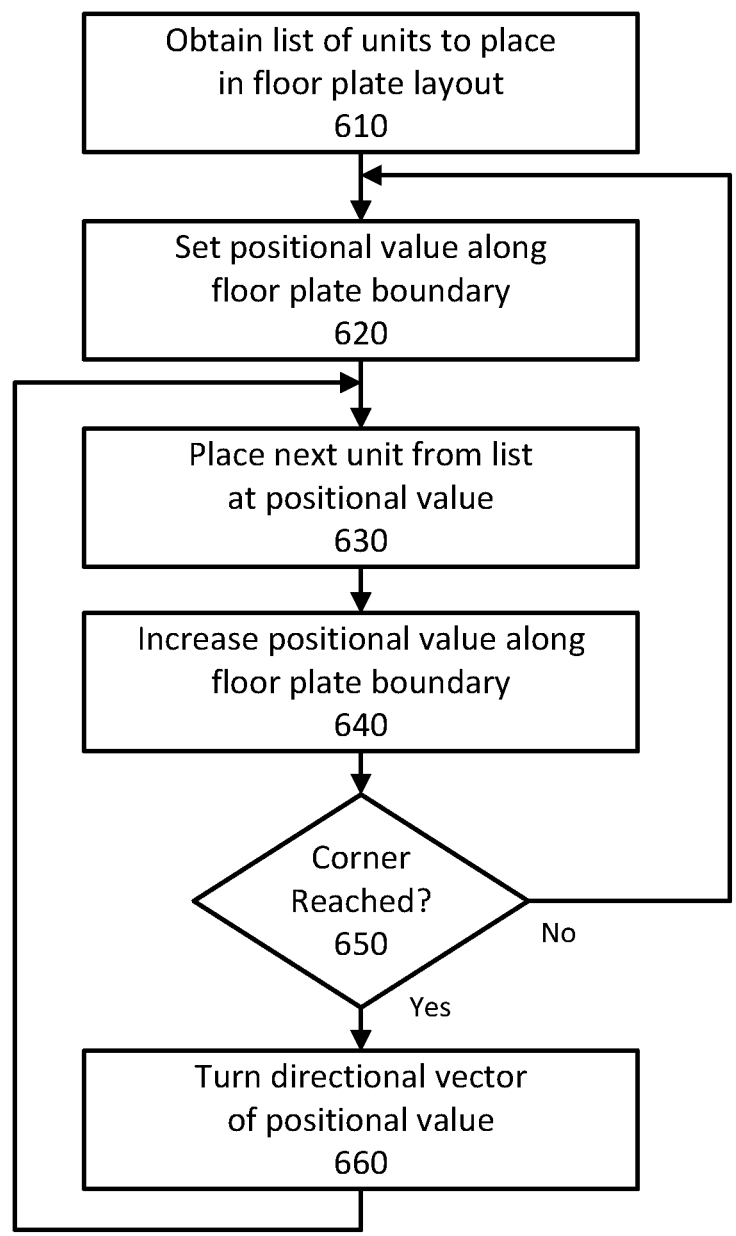
FIG. 6 is a flowchart of a more detailed process of generating an optimized building floor plate layout using the prioritized two-dimensional floor plate zones and the optimized mix of units according to one embodiment of the present approach.

Referring now to FIG. 6, in accordance with one embodiment, a more detailed example of Layout Solver Module 130 of FIG. 1 specifying a location of each unit of the different unit types within the generated floor plate layout according to step 230 of FIG. 2 is shown as process 600.

In step 610, Layout Solver Module 130 of FIG. 1 obtains a list of units to be placed in the floor plate layout from the optimum unit mix, which as has been explained is the final current unit mix, generated by the Unit Mix Solver Module 120 and the specified vertical transport zones (i.e., stairs zones and elevator zones). In one embodiment, obtaining the list of units to be placed in the floor plate layout from the optimum unit mix is accomplished by retrieving from Memory Module 140 of FIG. 1 the zone plate unit sets generated by Unit Mix Solver Module in step 540 of FIG. 5, and shown by example in FIG. 7, wherein each set, as was explained, identifies one or more units of one or more unit types, in some cases with adjusted unit widths as has been explained, to be included in each floor plate zone set.

Having obtained the list of units to be placed in the floor plate layout and the specified vertical transport zones in step 610, in step 620, Layout Solver Module of FIG. 1 proceeds to specify a particular location within the floor plate layout for each of the units of various unit types listed.

In one embodiment, Layout Solver Module of FIG. 1 specifies unit locations within the various floor plate zones in order of priority of the floor plate zones and does so by sequentially placing units within each zone in the order they are listed in the list obtained in step 610. This simplified approach obviates the need for subsequent steps 630 through 650 discussed below.

Figure 8:
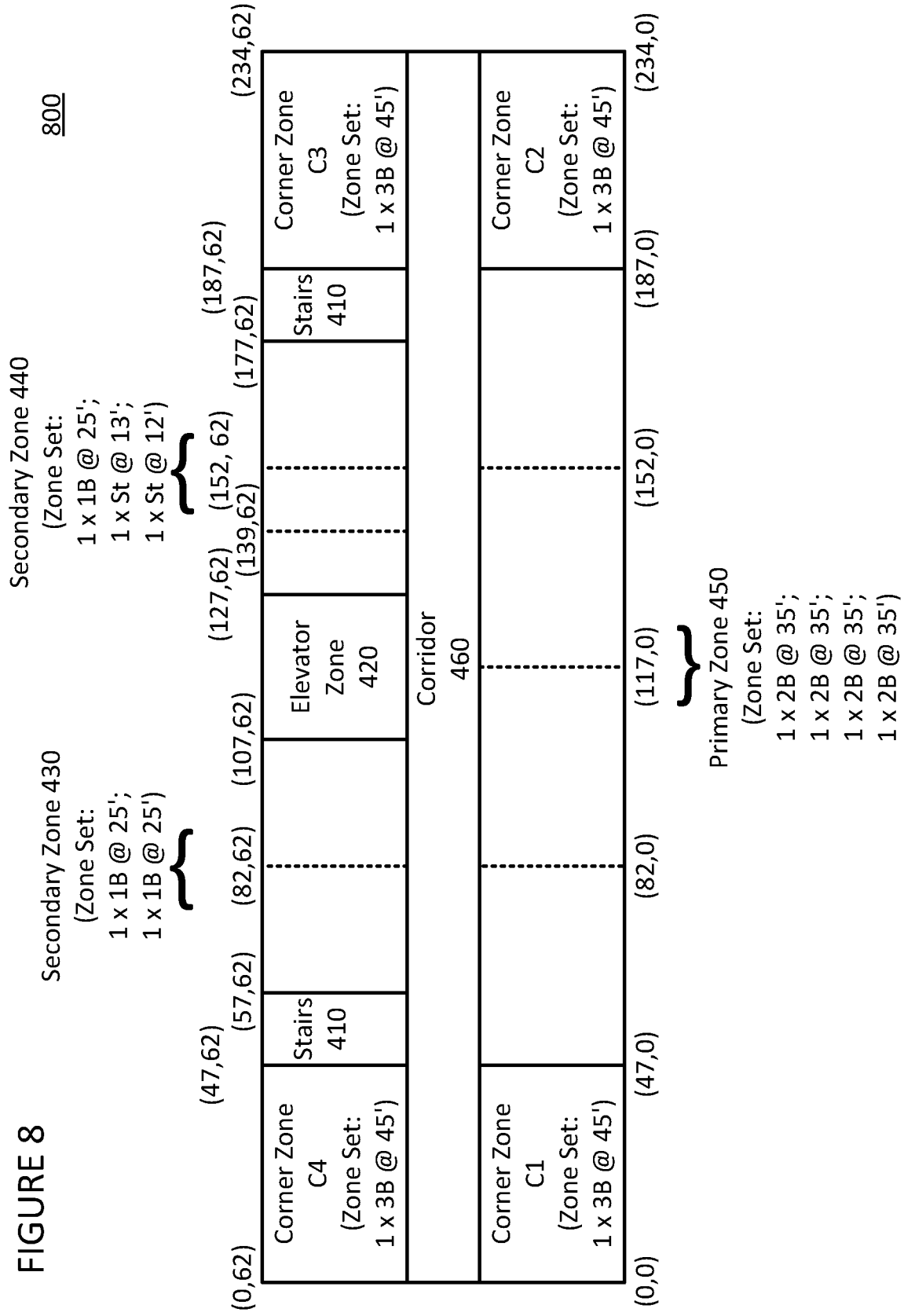
FIG. 8 is an example optimized building floor plate layout generated according to one embodiment of the present approach.

In an alternative embodiment, Layout Solver Module of FIG. 1 specifies unit locations within the various floor plate zones by first setting a starting positional value along whichever edge of the floor plate boundary has the highest envelope score as determined by the Floor Plate Solver Module 110 (e.g., Vertex 0 in FIG. 4). This is shown by example with reference to FIG. 8 where building floor plate layout 800 is shown having a starting positional value denoted "(0,0)" in the figure to indicate an origin value of zero in the X axis and zero in the Y axis for the floor plate layout along with a vector value along the X axis.

In step 630 of FIG. 6, Layout Solver Module 130 of FIG. 1 obtains a next unit from the list of units generated in step 610 and places that next unit in the floor plate layout at the positional value set in step 620. In one embodiment, placing a unit in the floor plate layout simply means storing one more positional value for that unit in a data set defining the floor plate layout, which can be stored in Memory Module 140 of FIG. 1. Using the example of FIG. 7, a three bedroom unit would thus be placed in Corner Zone C1 at positional value (0,0).

In step 640 of FIG. 6, Layout Solver Module 130 of FIG. 1 increases the positional value along the vector of the floor plate boundary edge by the defined width of the unit placed in step 630. Using the example of FIG. 7, the positional value is increased by the 47 feet width of the three bedroom unit added in step 630, thus resulting in a new positional value of (47,0), denoting a move of 47 along the X axis and no movement along the Y axis or change in vector direction.

In step 650, Layout Solver Module 130 determines whether the new positional value set in step 640 has reached a corner of the floor plate boundary (e.g., Vertex 1 in FIG. 4). Using the example, of FIG. 7, the new positional value of (47,0) set in Step 640 is compared to a corner value of (234,0), determinable by the specified length of the building to determine whether the corner has been reached. If the position value has reached a corner, which means the most recently placed unit in the floor plate layout along that building edge has reached a corner of the building, then in step 660 Layout Solver Module 130 reorients its directional vector in accordance with the building floor plate layout (e.g., less than 90 degrees in the case of a non-rectangular building, e.g., from the X axis direction upwards towards the Y axis direction), and returns to step 630 to again get units obtained in step 610 and now place them in the floor plate layout along that new direction. Such a continued unit placement is appropriate for a building corner that is less than 90 degrees. However, in the case of a building corner that is 90 degrees (e.g., a corner of a typical rectangular building as shown in this example) the new positional value is moved the depth of the previously placed corner unit, plus the width of the corridor, plus the standard unit depth, and the vector value is reoriented 180 degrees, to set the new positional value to correspond to the opposing corner of the building (e.g., to Vertex 2 in FIG. 4) in order to place units along the opposing edge (from Vertex 2 to Vertex 3 of FIG. 4) of the rectangular building as explained by example below.

Alternatively, if the positional value has not reached a corner, then the process returns to step 620 to again set the positional value now along the same edge of the floor plate boundary, again followed by step 630 to again obtain and place units in the floor plate layout along this building edge, again followed by step 640 to increase the positional value along this edge, and again followed by step 650 to determine if a corner has been reached. Using the example of FIG. 7, this results in four instances of two bedroom unit types being placed in Primary Zone 450, at positional values of (47,0), (82,0), (117,0) and (152,0), and a three bedroom unit type being placed in Corner Zone C2 at a positional value of (187,0).

Similarly, once a corner has been reached as determined in step 650 and now moving along a vector in the negative X direction, again using the example of FIG. 7, results in a three bedroom unit type being placed in Corner Zone C3 at positional value (234,62) (the 62 value in the Y direction being the sum of two 26 foot unit depths plus a 10 foot corridor, as specified and explained above), a set of stairs being placed in Stairs Zone 410 at positional value (187,62), a one bedroom unit type being placed in Secondary Zone 440 at positional value (177,62), a studio unit being placed in Secondary Zone 440 at positional value (152,62), a studio unit being placed at in Secondary Zone 440 positional value (139,62), an elevator zone being placed in Elevator Zone 420 at positional value (127,62), a one bedroom unit type being placed in Secondary Zone 430 at a positional value of (107,62), a one bedroom unit type being in Secondary Zone 430 placed at a positional value of (82,62), a set of stairs being placed in Stairs Zone 410 at positional value (57,62), and a three bedroom unit type being placed in Corner Zone C4 at positional value (47,62). It is to be noted that placing these various unit types at certain positional values has taken into account the unit types that were allocated additional width as discussed above in step 560 with reference to FIG. 5.

This process 600 of FIG. 6 thus continues until all of the units in the list of units obtained in step 610 are placed in the floor plate layout by the Layout Solver Module 130. In other words, having completed layout process 600, Layout Solver Module 130 has now placed all of the units from the optimum unit mix in the floor plate layout and in their optimum location within the floor plate layout while also maximizing width uniformity of unit types.

In a further embodiment, if the specified building parameters indicate that the building to be designed is a multistory building, then the now-generated floor plate layout is replicated for each story of the multistory building and each of the floor plate layouts is then stacked to achieve the multistory building. Replicating and stacking the floor plate layout for each floor of a multistory building has the advantage of interior uniformity in that stairwells and elevators, as well as plumbing and electrical elements and demising walls, are aligned between floors on the inside of the building and exterior uniformity in that window locations (e.g., for living rooms versus bathrooms, etc.) align on the outside of the building.

As has now been explained, the present approach automatically generates an optimized building floor plate layout given a set of building design parameters. Further, the present approach can automatically generate a different optimized building floor plate layout given a different set of building design parameters and can do so without necessarily having to repeat all of the operations performed when generating a previous optimized building floor plate layout.

The primary example described herein is the generation of an optimized floor plate layout for an apartment building. However, it is to be understood in light of the teachings herein that the present approach is equally applicable to any type of building that is to contain a mix of different unit types with a defined depth and width. As such, the present approach can be used to generate an optimized building floor plate layout for a condominium building, an office building, a hotel, a hospital, a parking structure, or any other residential or commercial structure. Further, it is to be understood that the approach described herein is agnostic to and therefore not dependent upon nor necessarily use any interior features (e.g., walls, etc.) of the units, whether specified or not, in generating an optimized building floor plate layout.

Further, the present approach is equally applicable to the generation of an optimized building floor plate layout across multiple buildings. In such a case, one embodiment simply duplicates a first building, whether single or multiple story, for other buildings. In another embodiment, which otherwise follows the process described herein, Floor Plate Solver Module 110 of FIG. 1 generates two-dimensional zones within the floor plates of more than one building where the two-dimensional zones are prioritized across the building parameters rather than prioritizing them for each building separately. According to this embodiment, one building may have a greater number of higher priority two-dimensional zones (due, for example, to that building's location, view, etc.) than another building and may therefore end up with more unit types having higher priority zones specified. Again, this other embodiment would otherwise follow the process described herein to generate an optimized floor plate layout, but now optimized across multiple buildings where one or more of the buildings may have different floor plate layouts than another building.

The disclosed system and method has been explained above with reference to several embodiments. Other embodiments will be apparent to those skilled in the art in light of this disclosure. Certain aspects of the described method and apparatus may readily be implemented using configurations or steps other than those described in the embodiments above, or in conjunction with elements other than or in addition to those described above. It will also be apparent that in some instances the order of steps described herein may be altered without changing the result or performance of all of the described steps.

There may be a single computing system, server or processor, or multiple computing systems, servers or processors to implement the system and perform the different functions described herein. One of skill in the art will appreciate how to determine which and how many of each will be appropriate for a specific intended application.

Further, it should also be appreciated that the described method and apparatus can be implemented in numerous ways, including as a process, an apparatus, or a system. The methods described herein may be implemented by program instructions for instructing a processor to perform such methods, and such instructions recorded on a non-transitory computer readable storage medium such as a hard disk drive, floppy disk, optical disc such as a compact disc (CD) or digital versatile disc (DVD), flash memory, etc., or communicated over a computer network wherein the program instructions are sent over optical or electronic communication links. It should be noted that the order of the steps of the methods described herein may be altered and still be within the scope of the disclosure.

These and other variations upon the embodiments described and shown herein are intended to be covered by the present disclosure, which is limited only by the appended claims.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive. It will be recognized that the terms "comprising," "including," and "having," as used herein, are specifically intended to be read as open-ended terms of art.

What is claimed is:

1. A method for generating an optimized building floor plate layout, the method comprising:
    generating, by a floor plate solver module, a set of prioritized two-dimensional zones within a perimeter of a building floor plate based on building dimensions and building envelope scores, wherein the prioritized two-dimensional zones define different functional areas comprising unit zones and one or more vertical transport zone;
    generating, by a unit mix solver module, an optimized mix of unit types based on a specified mix of unit types and the prioritized two-dimensional zones, wherein the optimized mix of unit types most closely matches the specified mix of unit types that fit in the prioritized two-dimensional zones, and wherein the optimized mix of unit types identifies which unit types of the optimized mix of unit types are to be placed in which of the prioritized two-dimensional zones; and,
    specifying, by a layout solver module, a location within the floor plate layout of each unit type of the optimized mix of unit types based on the optimized mix of unit types.

2. The method of claim 1 wherein the building envelope scores are based on building orientation and view scores.

3. The method of claim 1 wherein the unit zones comprise one or more corner zones, one or more primary zones, and one or more secondary zones.

4. The method of claim 1 wherein the one or more vertical zones comprise stairs and/or elevators.

5. The method of claim 1 wherein the unit types comprise three bedroom units, two bedroom units, one bedroom units and studio units.

6. The method of claim 1 wherein each of the unit types is predefined to have a depth, a minimum width and a maximum width.

7. The method of claim 1 wherein generating the optimized mix of unit types based on the specified mix of unit types and the prioritized two-dimensional zones comprises:
    (i) adding units, one per unit type, to the unit zones based on priority of the prioritized two-dimensional zones and the specified mix of unit types to create a current unit mix;
    (ii) calculating a delta between the specified mix of unit types and the current unit mix;
    (iii) selecting one unit of whichever unit type has a largest calculated delta from the calculated delta between the specified unit mix of unit types and the current unit mix;
    (iv) adding the selected one unit type having the largest calculated delta to the current unit mix based on the prioritized two-dimensional zones; and,
    (v) repeating steps (ii) through (iv) for any remaining room for another unit in any of the prioritized two-dimensional zones.

8. The method of claim 7 further comprising allocating any remaining space in the prioritized two-dimensional zones to one or more of the unit types added to the prioritized two-dimensional zones.

9. The method of claim 1 further comprising duplicating and stacking the generated optimized building floor plate layout to create more than one story for the building.

10. The method of claim 1 further comprising receiving a different specified mix of unit types and repeating the steps of generating the optimized mix of unit types and specifying the location of each unit type without repeating generating the prioritized two-dimensional zones.

* * * * *